Oct. 28, 1958  G. HAIN  2,857,669
CHEESE MAKING APPARATUS
Filed Sept. 26, 1956
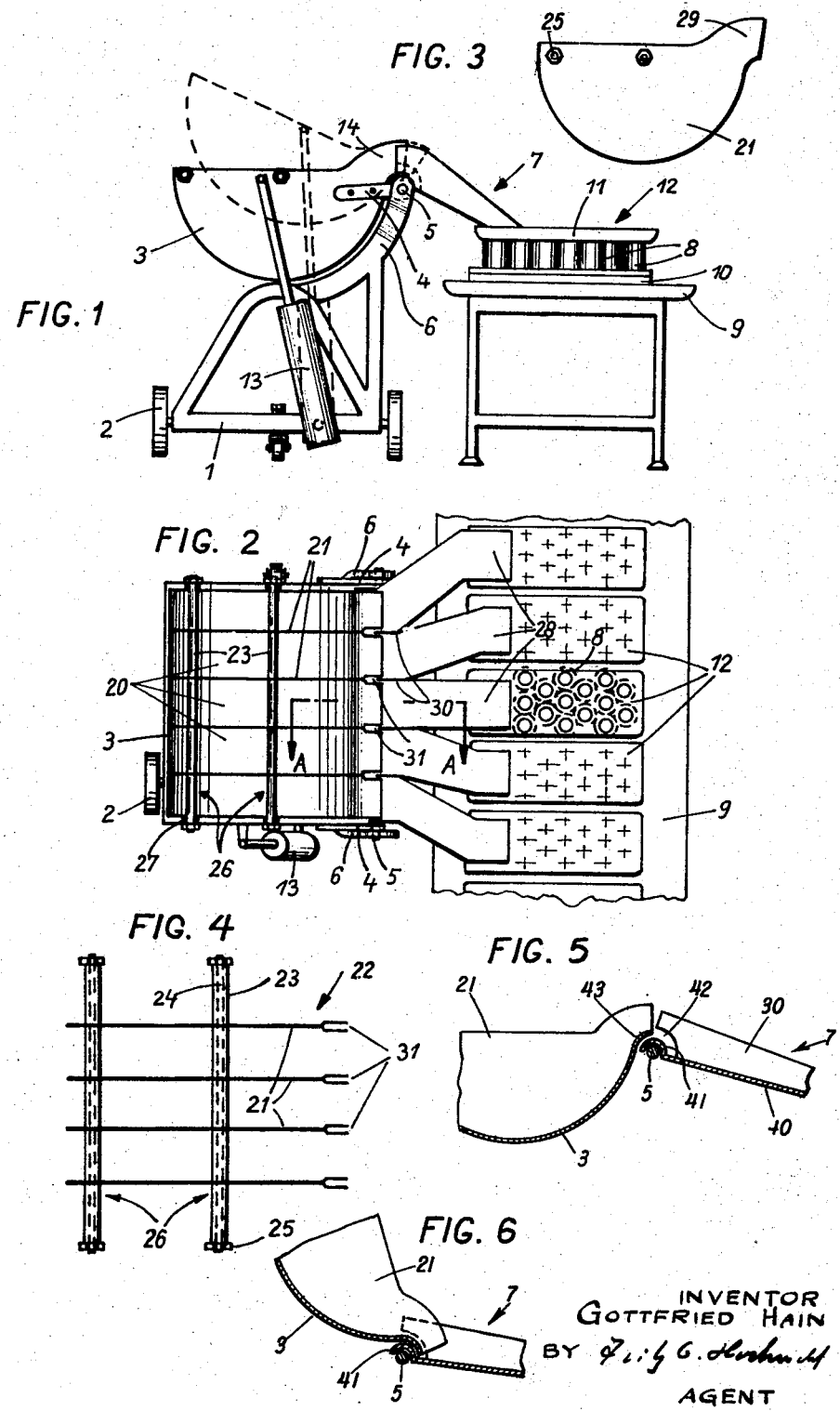
INVENTOR
GOTTFRIED HAIN
BY
AGENT

# United States Patent Office 2,857,669  
Patented Oct. 28, 1958

2,857,669

CHEESE MAKING APPARATUS

Gottfried Hain, Lehen, Upper Bavaria, Germany

Application September 26, 1956, Serial No. 612,246

Claims priority, application Germany June 5, 1953

5 Claims. (Cl. 31—47)

This invention relates to cheese making apparatus and more particularly to a device for filling cheese curd and the like into molds.

It is known to use tilting vats for this purpose; these known devices have, however, the drawback that their contents cannot be evenly distributed into several cheese forms or molds or groups of such forms and molds. In addition, it is difficult to discharge said known vats because on tipping the whole content presses forward and out. It is, however, important to transfer the curd as slowly as possible into the molds, so as to avoid its free fall; particularly in the processing of naturally cured cheese, especial attention has to be given to the careful treatment of the curd.

It is a principal object of the present invention to provide a tilting vat which allows of a ready and even distribution of the cheese curd into the molds.

Other objects and advantages will be apparent from a consideration of the specification and claims.

The invention will be better understood with reference to the accompanying drawings, which illustrate some preferred embodiments of the invention.

In the drawings:

Fig. 1 is an elevational view of a cheese making apparatus according to the invention comprising a tilting vat and a forming table;

Fig. 2 is a plan view of the apparatus of Fig. 1;

Fig. 3 is an elevational view of a vat inset;

Fig. 4 is a plan view of the insert of Fig. 3,

Fig. 5 is a detailed view, on a larger scale, of the chute in the deepest position of the vat, the section being taken along line A—A of Fig. 2, and Fig. 6 is a similar representation to Fig. 5, showing, however, the vat in tilted position.

The filling device according to the represented embodiment consists of a mobile support 1, which is preferably mounted on wheels 2 and of a semicircular vat 3 for the reception of the cheese curd with which it is to be filled. This vat is connected by means of the laterally fixed bearing arms 4 with a longitudinal tilting axis 5 provided at one of the longitudinal rims of the vats, said axis being carried pivotally by means of a bracket 6 of the support 1. The vat can be pivoted around this axis. A discharge chute 7 connects the tilting vat with the cheese molds 8 to be filled. The discharge chute is carried on the one end on the longitudinal axis 5 and on the other end on the cheese molds.

In Figs. 5 and 6 the engagement of the tilting vat with the discharge chute is shown in detail according to a section A—A of Fig. 2. For better clarity the support is not shown in this case. According to this figure the bottom plate 40 of the discharge chute 7 has at its one end a semicircular bend 41, by means of which the discharge chute bears on the longitudinal tilting axis 5. The partitions 30 of the discharge chute are not extended up to the bend but terminate short of it at a distance leaving a free space 42 receiving on tilting of the vat its bent longitudinal edge 43 (Fig. 6). This longitudinal edge 43 passes in the complete length of the vat over the bend 41 of the discharge chute without bearing on this latter.

In the embodiment several cheese molds are composed to form a set of molds and they are held together by a bottom plate 10 reposing on the forming table 9 as well as by a filling plate 11. Several of such sets of molds 12 are arranged on the forming table, as is usual in the general art (Fig. 2). The vat can be brought into a tilted position (in dotted lines) by hand or mechanically, e. g. by a pneumatically or hydraulically lifting cylinder 13. The housing of said cylinder may be pivotally secured to the support, and the piston rod of the cylinder engages the outer rim of the vat. In order to assure a good engagement of the tilting vat and of the discharge chute at the outer end, nose-shaped lugs 14 are provided at the transverse side of the vat in the direction toward the longitudinal tilting axis. These extensions are swung into the lateral walls of the discharge chute (Fig. 1).

According to the invention the tilting vat 3 is subdivided into several uniform sections 20. This may be obtained by partitions 21 which are built in a fixed manner into the vat or are inserted loosely into it. In this latter case the partitions are connected at an equal distance from each other to form an inset 22 (Fig. 4). In order to hold fast the partitions spacer tubes 23 are provided. Just like the partitions they are pushed on bolts 24 which pass through the whole device. Screw nuts 25 hold the complete system together. Suitably screw nuts with a bigger diameter than the diameter of the spacer tubes are used, in order to obtain simultaneously an abutment and fixing means when inserting the inset into the tilting vat. In order to connect the partitions to an inset, generally two spacer holding devices 26 are sufficient. Both holding devices are preferably provided at the upper straight edges of the partitions, one about in the middle of the vat and the other at the end opposite to the tilting vat. Accordingly arranged fixation bearings 27 on the transverse wall of the vat serve to receive the said holding devices 26.

The discharge chute 7 is composed of as many individual discharge chutes 24 as individual sections are provided in the inset of the vat. Thus each section 20 has its own discharge chute which is provided in such a way, that the ends of the chute corresponds in their width, directed toward the vat, exactly to the width of the inset section. Thus an overflowing of the cheese curd from one section into the other is impossible. For this purpose nose-shaped lugs 29 (Fig. 3) are preferably arranged at each partition in the same manner as the lugs at the lateral walls of the vat. According to the Figures 1 and 2 the individual discharge chutes 28 at the side of the vat are made of one piece and are suitably subdivided by means of the partition 30. Toward the sets of cheese molds the discharge chute, shaped as a whole, may subdivide into separated individual chutes, corresponding to the mold sets arranged on the forming table. The discharge chute 7 consisting of several individual chutes bears, as already stated, with its one end on the longitudinal tilting axis 5. The partitions 30 of the discharge chute are situated in the same plane with the partitions 21 of the inset 22. In order to allow an intersection of these registering partitions during the tilting, it is suitable to offset the partitions or separating walls respectively at their two adjacent ends correspondingly far from each other. It is preferable to execute the free ends of the lug 29 with double walls between which there is a space 31 corresponding to the thickness of the partition, so that in tilting this extension may straddle the partition of the discharge chute.

According to the invention the discharge chute is fixed with its one end at the same level as the longitudinal tilting axis. Preferably it is supported by this tilting axis, respectively it is engaged into it. This connection of the discharge chute, which may be easily loosened, makes possible, above all, the easy cleaning of the single parts as well as the removal of the said chutes when the tilting vat is shifted laterally to the cheese forming table. A particular feature of this device is, that the discharge chute does not change its position during the complete tilting process, so that the discharge of the cheese curd is effected under constantly equal conditions.

The length of the tilting vat corresponds to the length of a mold or set of molds which is fed by a discharge of the vat. The other dimensions of the vat can be determined by the width and capacity of the serviced group comprising several sets of forms or hoops.

It is not necessary to design the volume of the vat for a single discharge. The vat may contain two or more fillings for a plurality of mold sets or groups. In the latter case, I prefer to provide for a stepwise tilting of the vat; in this way, it is possible to discharge always only that amount which corresponds to the charge of a predetermined number of forms.

It should be noted that the partitions have the additional advantage of stabilizing the curd on turning, tilting, or rolling the vat and prevent its spilling.

While I have shown and described certain embodiments of my invention, it is to be understood that the invention is capable of many modifications. For instance, the partitions may be combined with a cutter frame, or instead of making the vat tiltable, the chutes, which may be integral with the vat or the inset or removable, may be pivotally arranged with respect to the compartments. All such changes may be made without departing from the spirit and scope of the invention as defined in the appended claims.

What is claimed is:

1. An apparatus for making cheese comprising a portable support, a curd receiving tilting vat having a rim portion, said rim portion pivotally mounted on said support, substantially parallel partitions in said vat arranged perpendicularly to said rim portion and dividing the vat into compartments, and a discharge chute adjacent to and below the rim of the vat and positively guiding the discharged curd from said vat into cheese molds when the vat is tilted.

2. The apparatus of claim 1, wherein said discharge chute is constituted of a plurality of individual chutes communicating with respective compartments of the vat.

3. An apparatus for making cheese comprising a portable support, a curd receiving tilting vat having a substantially straight rim portion, said rim portion pivotally mounted on said support, a removable inset mounted in the vat, consisting of partitions arranged perpendicularly to said rim portion and dividing the vat into compartments of equal size, and a discharge chute on which said rim portion is carried and positively guiding the discharged curd from said vat into cheese molds when the vat is tilted, said discharge chute consisting of a plurality of individual chutes communicating with respective compartments of the vat.

4. An apparatus as defined in claim 3, wherein said vat has edges receiving a portion of said inset.

5. An apparatus as defined in claim 3, wherein said inset consists of partitions detachably secured to each other by means of spacer bolts.

References Cited in the file of this patent

UNITED STATES PATENTS

| 2,088,763 | Sample | Aug. 3, 1937 |
| 2,363,759 | Waldie | Nov. 28, 1944 |

FOREIGN PATENTS

| 713,382 | Germany | Nov. 6, 1941 |